Patented Oct. 11, 1932

1,881,970

UNITED STATES PATENT OFFICE

JOHN E. PILLING, OF PROVIDENCE, RHODE ISLAND

METHOD OF PREPARING CHAINS FOR SOLDERING AND A COMPOSITION OF MATTER USED IN SUCH PREPARATION

No Drawing.   Application filed May 7, 1929.   Serial No. 361,249.

This invention relates to a method of preparing chains for soldering and a composition of matter used in such preparation. It is intended primarily to be used with machine made metal chains.

Heretofore it has been the custom in making links to use solder filled wire, that is a wire having a core of soldering material which upon being heated softens and unites the link ends together. Later it has been proposed to make the links of solid wire and deposit upon them by electrolytic action a film of soldering material, after which the links are subjected to heat so that the film of soldering material between the link ends becomes set and binds these ends together. The cost of producing solid filled wire is high and it is very desirable from the view point of expense to make the links of solid wire. But when such links are to be coated with a film of soldering material, it is necessary to take great pains to have the links clean and free from all foreign matter before the soldering material is applied. Moreover when the film of such material has been deposited on the links it leaves them with a surface that may later have to be removed before the jeweler using the chain can plate them as he desires.

Accordingly it is an object of the present invention to employ solid wire links and to prepare them for soldering in a manner which can be easily worked and at small expense.

In carrying out my method, the chain as it comes from the chain making machine is wound up in skeins or hanks in such lengths as can be conveniently handled. Each hank is then covered with a powdered composition which I prepare by mixing together two parts of tin to one part each of copper and red phosphorus. These ingredients are used in the powdered state, the tin being known as 200 mesh, the copper being almost a fine dust and the red phosphorus being such as is commercially available.

When the chain is covered with the powdered mixture the latter is rubbed into the minute spaces or joints between the abutting ends of the links. The powder readily adheres to the chain because the latter when it comes from the chain making machine has a thin film of oil upon it. The chain is rubbed thoroughly with the powder until the joints are deemed to be filled therewith after which the excess powder on the surface of the links is rubbed off. Preferably the chain is subjected to a second bath of the powdered mixture in order to insure the joints being completely filled and so that the additional dry powder and accompanying rubbing may remove any of the first powder that remained on the surface. If the chain when first submitted to the powder was unusually moist, it may be desirable to repeat the powder bath a third time, but ordinarily the rubbing of the hanks in two successive pans of powder is sufficient.

To further insure that none of the mixture remains on the chain surface, as distinguished from the joints, the hank is next rubbed with powdered graphite which has been very slightly moistened with water to cause it to adhere to the chain surface. The rubbing is continued until the excess of graphite is removed and only a very thin coating remains on the links. The hanks are then covered with powdered magnesium and further rubbed and finally the hank is dusted with powdered talc.

The hanks are now undone and the chain either laid out in pans or reeled upon frames so that its links are fully exposed. It is now ready for the heat treatment. This can be applied in the same manner as heretofore practiced with solder filled chains, the degree of heat and the time of exposure being dependent entirely upon the size and material of the chain. When properly heated the ends of each link are securely soldered together and the surface of the link is that of the material from which it is made, there being no film or deposit thereon.

Among the advantages of preparing chains for soldering as described above are (1) that a chain with links of solid wire can be treated just as it comes from the chain making machine, thus making it unnecessary to clean the chain, (2) the powdered mixture which constitutes the solder is only retained in the joints and therefore there is ultimately no change in the surface of the original links, and (3) the powdered mixture is relatively inexpensive and (4) the preparation of the chain for soldering can be accomplished by relatively unskilled operatives.

What I claim as my invention is:

A composition of matter for use in the preparation of chains for soldering consisting of two parts of powdered tin, one part of powdered copper and one part of red phosphorus.

Signed at Providence, Rhode Island, this 6th day of May, 1929.

JOHN E. PILLING.